United States Patent [19]

Boyd et al.

[11] 4,392,905

[45] Jul. 12, 1983

[54] METHOD OF TRANSFERRING DESIGNS ONTO ARTICLES

[75] Inventors: Mary G. Boyd, Framingham; Donald R. Smith, Dover, both of Mass.

[73] Assignee: Dennison Manufacturing Company, Framingham, Mass.

[21] Appl. No.: 288,589

[22] Filed: Jul. 30, 1981

[51] Int. Cl.$^3$ ........................ B32B 31/00; B65C 9/25; C09J 5/06

[52] U.S. Cl. .................................... 156/235; 156/240; 156/249; 156/330.9; 156/344; 156/320; 156/321; 156/493; 428/349; 428/914

[58] Field of Search ............... 156/240, 230, 235, 238, 156/249, 289, 344, 331.2, 277, 540, 493, 321, 320, 322, 330.9; 428/42, 43, 914, 352, 349; 106/27; 427/411, 148

[56] References Cited

U.S. PATENT DOCUMENTS

| | | | |
|---|---|---|---|
| 3,379,604 | 4/1968 | Weber et al. | 156/240 |
| 3,436,293 | 4/1969 | Newman | 156/240 |
| 3,616,176 | 10/1971 | Jachimowicz | 156/240 |
| 3,847,697 | 11/1974 | Baker et al. | 156/235 |
| 3,887,420 | 6/1975 | Weingrad | 156/240 |
| 3,899,379 | 8/1975 | Wanesky | 156/235 |
| 4,068,033 | 1/1978 | Meade | 428/914 |
| 4,211,810 | 7/1980 | Barta | 156/240 |
| 4,251,276 | 2/1981 | Ferree, Jr. et al. | 106/27 |
| 4,303,717 | 12/1981 | Andrews | 427/411 |

*Primary Examiner*—Edward C. Kimlin
*Assistant Examiner*—Louis Falasco
*Attorney, Agent, or Firm*—Barry D. Josephs; Arthur B. Moore; George E. Kersey

[57] ABSTRACT

A decorative laminate and method of transferring designs onto articles. The laminate is formed of a transfer substrate affixed to a support member. The transfer substrate is composed of a protective layer, an ink layer and a resinous coating layer. Optionally, a barrier layer is provided between the resinous layer and the ink layer. In many applications the protective coating layer may be omitted. The laminate is applied to an article using a heated silicone rubber transfer pad to which the transfer substrate adheres during the transfer process.

38 Claims, 5 Drawing Figures

METHOD OF TRANSFERRING DESIGNS ONTO ARTICLES

BACKGROUND OF THE INVENTION

1. FIELD OF THE INVENTION

The present invention relates to the heat transfer labeling of designs onto an article, and in particular to decorative laminates to be used in the process.

2. Description of the Prior Art

Prior art methods for imprinting designs onto articles using a heat transfer labeling process typically involve decorative laminates consisting of a paper base sheet or web coated with a wax over which a design is imprinted in ink.

U.S. Pat. No. 3,616,015 is illustrative of the prior art. In U.S. Pat. No. 3,616,015 a label carrying web involving a heat transfer labeling process for imprinting designs onto articles is subjected to heat and the laminate is pressed onto an article with the ink design layer making direct contact with the article. As the paper sheet is subjected to heat, the wax layer begins to melt so that the paper sheet can be released from the wax layer. After transfer of the design to the article, the paper sheet is immediately removed, leaving the design firmly attached to the surface with the wax layer exposed to the environment. The exposed wax layer is then subjected to jets of hot air to remelt the wax which forms a clear protective coating over the ink design as it cools and solidifies. This prior art method has the advantage that the ink layer can be composed of a multiplicity of colors and the process may be reliably adapted to an automated process for imprinting designs onto a variety of articles including glass and plastic. However, the principal disadvantage of the method is that since the laminate is transferred directly to an article from a large continuous web, the laminate lacks sufficient flexibility to conform to surfaces having compound or sharp curvature. The method is therefore not effectively adaptable to imprinting objects having surfaces of compound or irregular curvature or recessed panels.

U.S. Pat. No. 3,616,176 discloses a heat transfer laminate of a type related to that disclosed in U.S. Pat. No. 3,616,015. In U.S. Pat. 3,616,176 the laminate is composed of a base sheet, with a polyamide layer covering the base sheet and a decorative ink layer covering the polyamide layer. Sufficient heat is applied to the laminate to heat the polyamide layer at or above its softening point, and the laminate is then pressed onto the surface of an article with the decorative ink layer coming into direct contact. Upon withdrawal of the heat source the polyamide layer cools to a temperature below its softening point and the base sheet is removed. The decorative layer becomes fused or heat sealed to the article. Since the polyamide layer lies over the decorative layer, it does not contact the article directly and therefore does not function as a contact adhesive. The decorative laminate disclosed in U.S. Pat. No. 3,616,176 has a significant disadvantage that since the base sheet is in contact with the laminate as it is imprinted onto the article, the laminate lacks sufficient flexibility to satisfactorily imprint surfaces having compound or sharp curvature.

U.S. patent application Ser. No. 130,303, commonly assigned with the present patent application, discloses a heat transfer label of the type illustrated in U.S. Pat. No. 3,616,015. The heat transfer label disclosed in Ser. No. 130,303 is composed of a carrier member (base sheet) overcoated in designated regions with a release layer and an ink design layer. Optionally a barrier layer is included between the release layer and the ink layer. The release layer is typically composed of a polymerization product of a diamine with the dimer of a fatty acid and is contoured to reduce the halo effect of the label as it is transferred onto an article. The optional barrier layer may be formed of an aromatic acid based polyester covering and overlapping the release layer by a margin. This patent application does not suggest a solution to the above-mentioned limitations of the heat transfer labelling process.

U.S. patent application Ser. No. 146,999 commonly assigned with the present patent application also discloses a heat transfer label of the type illustrated in U.S. Pat. No. 3,616,015. The heat transfer label disclosed in Ser. No. 146,999 is composed of a carrier member (base sheet) overcoated in designated regions with a release wax layer, a protective layer, an ink design layer and an adhesive layer. The protective layer provides enhanced chemical resistance for the heat transfer label and permits the heat transfer label to resist distortion during the heat transfer process. The protective layer is typically composed of an aromtic acid based polyester and a resin ester. This patent application does not suggest a solution to the above-mentioned limitations of the heat transfer labelling process.

A second prior art method for imprinting objects employs a flexible transfer pad. Ink is transferred to a transfer pad such as a porous silicone rubber pad, and then transferred directly from the pad to the surface of an article. This method has the advantage over the heat transfer labelling process disclosed in U.S. Pat. No. 3,616,015 in that it is suitable for imprinting articles having a wide range of shapes. This method has the additional advantage in that it employs assembly line equipment which is of simpler design than that disclosed in U.S. Pat. No. 3,616,015. Therefore there is less adjustment to the assembly line required in retooling the process to accept articles of a different size and shape. This feature allows smaller quantities of different sized articles to be imprinted with a reduction in the down time between runs. This process on the other hand suffers the disadvantage that only one color ink may be transferred at one time per transfer pad, thus making the process slow if multicolored designs are desired. Also since there is no protective coating covering the ink design, it is left exposed directly to the environment upon transfer to the article, thus directly subjecting the ink design to corrosive elements in the environment which would tend to deteriorate the print quality over a period of time.

U.S. Pat. No. 3,887,420 discloses the use of a silicone rubber pad to transfer designs from a decorative laminate to ceramic articles. The laminate includes a base layer such as a paper sheet overlayed with a coating of wax. The wax coating is coated with a film layer (Film B), which in turn is overcoated with an ink design layer and a second film (Film A). As the laminate is heated to within a narrow ten degree temperature range Film A is alleged to become adhesive while the wax coating and Film B become molten and nonadhesive. A flexible transfer pad, typically of silicone rubber, is pressed against the laminate to make contact with Film A. The transfer pad purportedly sticks to Film A so that as the transfer pad is withdrawn the substrate composed of the paper sheet and wax coating separates from the remainder of the laminate. The laminate adhering to the transfer pad is pressed onto a ceramic article, and the temperature of the laminate is dropped to within a narrow ten degree temperature range. At this temperature, Film A becomes adhesive and Film B is alleged to exhibit diminished adhesion. Thus, as the laminate is pressed onto the article with Film B contacting the article, the laminate is alleged to adhere to the article and released from the transfer pad as the pad is withdrawn.

The film layers A and B are each adhesive over only a very narrow ten degree temperature range, making it impracticable to control the described process within the context of an automated process, since each film layer must in turn be heated or cooled to within the required ten degree temperature range to make the process workable.

Precision heating or cooling of Film A and Film B to within such narrow temperature ranges is impossible to achieve or control within the split second time intervals required by an automated assembly process. Furthermore, the inclusion of a wax layer to form part of the substrate has the disadvantage that as the substrate is released from Film B there will be a tendency for a portion of the wax to remain attached to Film B. This will interfere with and retard the adhesive characteristic of Film B as the laminate is transferred from the transfer pad to an object.

Accordingly, it is an object of the present invention to provide a decorative laminate and method adaptable to an automated system for transferring the laminate from a support member to a transfer pad and thence to an article.

Another object of the invention is to provide a decorative laminate which achieves multicolor pad transfer decoration in a single transfer operation.

Another object of the invention is to provide a decorative laminate which permanently adheres to any article without subsequent firing of the laminate.

A further object of the invention is to achieve a pad transfer method which satisfies the above criteria while being compatible with automated operation.

SUMMARY OF THE INVENTION

In accomplishing the foregoing and related objects, the invention provides a transfer process employing a decorative laminate including a design and transfer substrate which are transposed from a support member to a transfer pad and thence to an article.

The invention has the advantage that the transfer substrate may be composed of either a single colored decorative design or a multicolored decorative design including halftone colors.

Another advantage of the invention is that the transfer substrate may be transferred to virtually any type of article irrespective of its shape or degree of surface curvature without causing distortion to the design imprint. Thus, the article may, for example, be composed of ceramic, glass, plastic, or paper or foil or polymeric film and the surface to which the transfer substrate is transposed may be flat or include compound curves, irregular surfaces, or recessed panels.

The decorative laminate of the invention is composed of a support, typically a substrate composed of a paper sheet, which is coated on one side with a transfer substrate. The transfer substrate is composed of a resinous coating layer in contact with the support, an ink layer covering the resinous coating layer and preferably a protective coating layer over the ink layer. In many applications the protective coating may be omitted. The transfer substrate optionally includes a barrier coating between the resinous coating and the ink layer to prevent absorption of ink into the resinous coating.

The resinous coating layer has the unique property that it functions as a release layer to permit separation of the support substrate in one step of the process, and as an adhesive to permanently bond the imprint ink layer to an article in another step of the process.

In the process of the invention, the transfer substrate is transferred from the support to a transfer pad and therefrom to an article. The process includes a first step wherein sufficient heat is applied to an exposed undersurface of the support, preferably through conduction, for example, through a hot platen in contact with the undersurface. Heat is transferred to the support to heat it to a temperature sufficiently high that the protective coating layer becomes tacky and the resinous coating softens and begins to melt. The softened resinous coating functions as a release layer to permit the support to be removed from the transfer substrate. The support is heated to a first temperature which is above the melting point of the resinous coating, typically a temperature of about 390° F. to 420° F. A transfer pad preferably composed of silicone rubber, advantageously having a smooth contact surface, is heated to a second temperature which is lower than the temperature to which the support is heated, preferably about 40° to 120° F. lower than the temperature to which the support substrate is heated. Typically the transfer pad is heated to a temperature between about 300° F. to 350° F.

The process includes a second step in which the hot transfer pad is pressed against the decorative laminate so as to make pressure contact with the protective coating layer. If the transfer substrate does not contain a protective coating, the hot transfer pad makes pressure contact with the ink layer as the hot transfer pad is pressed against the decorative laminate. At this point the resinous coating has softened and has begun to melt, and the protective coating (or ink layer if the protective coating is not used) is sufficiently tacky so that as the transer pad is withdrawn in a third step the resinous coating splits to separate from the support thus releasing the support. The protective coating or ink layer in contact with the transfer pad is sufficiently tacky so that the transfer substrate adheres to the transfer pad.

The process includes a fourth step wherein the hot transfer pad and adhering transfer substrate is pressed onto a surface of an object of virtually any surface configuration. The time interval between steps three and four, i.e., between release of the support and contact between the transfer substrate and the article, should be preferably less than about 5 seconds, most preferably between about 0.2 to 5 seconds.

The temperature of the transfer substrate including that of the resinous coating layer and protective coating will drop slightly between steps three and four to approach the temperature of the hot rubber transfer pad. The resinous coating is tacky even at the higher temperature at which release of the support occurred and will remain tacky and may exhibit an increase in its adhesive characteristic as the temperature drop approaches the temperature to which the transfer pad has been heated. At the same time, the drop in temperature between steps three and four causes the adhesive coefficient between the protective coating and the transfer pad to decrease. If the transfer substrate does not contain a protective coating layer, the ink layer composition is preferably such that its adhesive characteristic will also tend to diminish as the temperature of the transfer substrate decreases between steps three and four. Preferably the transfer pad is continually heated to maintain the desired pad temperature.

The time interval between steps three and four should be less than about 5 seconds, more preferably between about 0.2 to 5 seconds.

As the transfer substrate is pressed onto the article, the resinous coating layer comes into contact with the article and exhibits a tacky adhesive quality which is greater than the coefficient of adhesion between the transfer substrate and the transfer pad. Therefore, as the transfer pad is withdrawn away from the article in a fifth step of the process, the transfer substrate releases from the transfer pad and remains in adhesive contact with the article. The resinous coating further functions to permanently bond the transfer substrate to the article as cooling occurs. As the transfer substrate dries the protective coating, if used, forms a hard protective coating over the ink layer thus protecting the ink layer from the environment.

Applicants have discovered that a preferred resinous coating having the above described release and adhesive properties is composed of a polyamide resin made by the polymerization of a diamine with dimer of a fatty acid, and includes a plasticizer such as caster oil preferably modified by the addition of erucamide which is a fatty amide of cis-13-docosenoic acid.

It has been discovered that the aforementioned desirable properties for the resinous coating layer may be satisfactorily achieved when the dried resinous coating is composed of at least 80 weight percent of the polyamide resin and preferably between about 80 to 100 weight percent resin, the remainder of the resinous coating being composed of a plasticizer such as castor oil.

It has been discovered that if the resinous coating includes erucamide, additional plasticizer may be included in the formulation to increase the fluidity of the resinous coating layer. If erucamide is added, then it has been found that the polyamide resin may comprise preferably at least 70 weight percent, more preferably between about 70 to 90 weight percent of the resinous coating, and the ratio by weight of plasticizer to erucamide may be preferably between about 5/1 to 15/1.

The preferred polyamide resin is composed of the polymerization product of a linear methylene diamine and dimerized fatty acid. Specific polyamide resins which have been found to be particularly suitable are the polymerization products of hexamethylene diamine and dimerized linoleic acid, and tetramethylene diamine and dimerized oleic acid.

Alternative constituents for the resinous coating may include polyterpenes, vinyl toluene/alpha methyl styrene copolymers and ethylene/vinyl acetate copolymers. These constituents may be used without additional additives, or plasticizers such as castor oil may be added with or without erucamide.

A preferred plasticizer is castor oil. Alternative plasticizers may include rosin esters, chlorinated paraffins, aliphatic esters, epoxy esters, alkyl aromatic phthalates, glycol esters, and alkyl aromatic phosphates.

Applicants have found that a preferred composition for the dried protective coating and optional barrier layer consists of the combination of a polymer (i) which is a film forming, multiaromatic, acid based polyester, preferably linear which is reinforced by a second polymer (ii) containing bulky ring structures such as polymerized rosin esters. The multiaromatic acid based polyester (Polymer (i)) should comprise between about 50 to 80 percent by weight of the dried protective coating layer or the optional barrier layer with the polymerized rosin ester (Polymer (ii)) comprising the balance of the mixture, i.e. between about 20 to 50 percent by weight.

The multiarmoatic acid based polyester (Polymer (i)) is preferably composed of the polymer condensation products of polyester forming reactants of one or more glycols reacted with napthalic or phthalic acids.

A preferred rosin ester (Polymer (ii)) is formed typically of the reaction product of a polyhydric alcohol, maleic anhydride or phenol aldehyde reacted with rosin acids such as abietic and pimaric acids. The rosin ester (Polymer (ii)) is preferably composed of methyl abietate, methyl hydroabietate, glyceryl hydroabietate or ester gum.

The ink layer may be composed of a single colored ink or may include a multiplicity of differently colored inks. The ink may be composed of any conventional nitrocellulose ink, preferably a polyamide-nitrocellulose ink. Alternatively inks having an acrylic, polyester, or vinyl base are also particularly suitable.

If the transfer substrate does not include a protective layer, the ink layer is preferably composed of a isobutyl methacrylate ink modified with maleic rosin and polyisoprene. Alternatively inks having a polyamide-nitrocellulose or vinyl base may be adopted if the substrate does not include a protective layer.

The basis weight of the dried resinous coating layer may be preferably between about 1.5 to 15 lbs./ream, and the dried protective coating layer or barrier layer from about 0.5 to 3 lbs./ream (3,000 sq. ft. per ream).

DESCRIPTION OF THE DRAWINGS

Other aspects of the invention will become more apparent after considering several illustrative embodiments of the invention taken in conjunction with the drawings.

DETAILED DESCRIPTION

Figure 1:
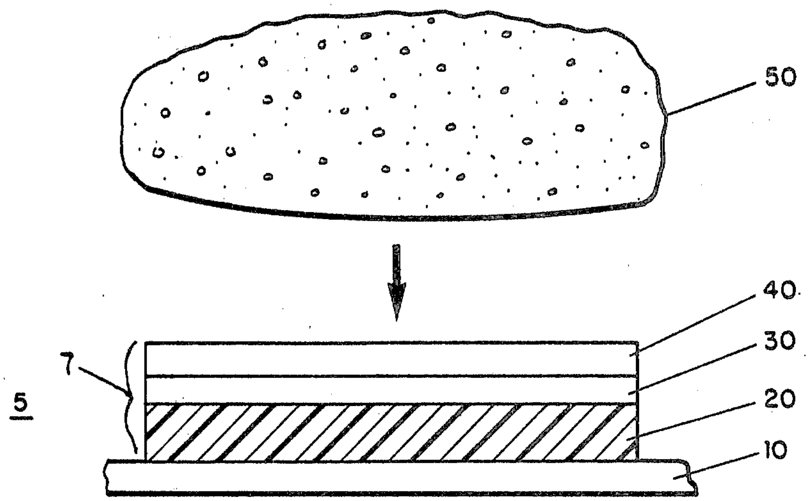
FIG. 1 is an elevated view of the decorative laminate of the invention and the transfer pad before the transfer pad is pressed onto the laminate.
Figure 2:
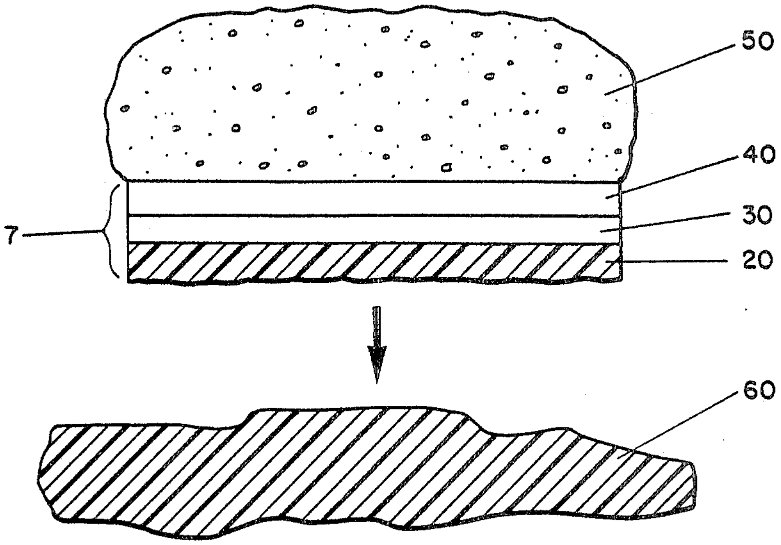
FIG. 2 is an elevated view of the decorative laminate of the invention and the transfer pad after contact is made between the pad and the laminate and the support released.

A preferred embodiment of the decorative laminate of the invention is shown in FIG. 1. The decorative laminate 5 of the invention is composed of a support 10, typically a substrate composed of a paper sheet or web which is affixed at least on one side to a transfer substrate 7. Transfer substrate 7 as best shown in FIGS. 1 and 2, is preferably composed of a resinous coating layer 20, an imprint ink layer 30 and a protective coating 40. Optionally, as shown in FIG. 3, the laminate 5 and substrate 7 may include a barrier layer 25 between ink layer 30 and resinous coating 20.

Laminate 5 is formed by providing support 10 with a resinous coating 20 on at least one side of support 10. Resinous coating 20 is overcoated with an ink layer 30 composed of letters or designs imprinted in ink. Ink layer 30 is in turn provided with an overcoating of protective coating layer 40. The transfer substrate 7 may also be provided with a resinous barrier coating between ink layer 30 and resinous coating 20.

Figure 3:
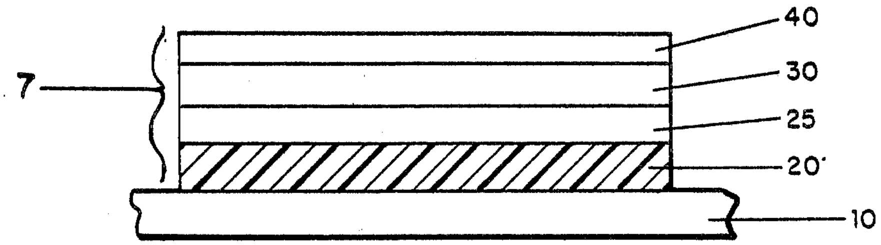
FIG. 3 is an elevated view of the decorative laminate of the invention with inclusion of a barrier layer.

The barrier coating 25 illustrated in FIG. 3 may typically be of the same composition as protective coating 40 and prevents absorption of the ink into the resinous coating 20. Use of a protective coating layer 40 is particularly advantageous when the container contents includes corrosive or abrasive elements such as alcohol, cosmetics, toiletries, food and dairy products, beverages or frozen goods.

Figure 4:
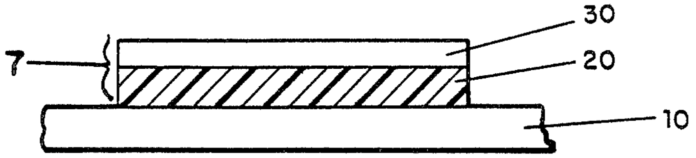
FIG. 4 is an elevated view of the decorative laminate of the invention without a protective coating layer.
Figure 5:
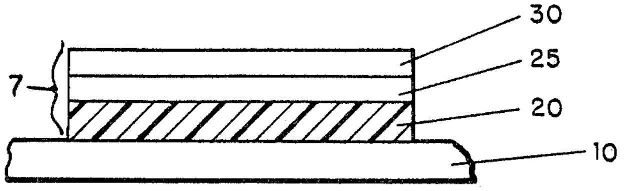
FIG. 5 is an elevated view of the decorative laminate of the invention without a protective coating layer and with inclusion of a barrier layer.

Alternatively the protective coating layer 40 may be omitted from the transfer substrate 7 as illustrated in FIGS. 4 and 5. Protective coating layer 40 may be omitted in labeling applications, particularly wherein the transfer substrate 7 will not be exposed to harsh chemicals or corrosive elements, for example when applied to tags or containers holding chemically inactive material. In such case the transfer substrate 7 may be composed of resinous coating 20 overcoated with an ink layer 30 as illustrated in FIG. 4.

The transfer substrate 7 without a protective coating layer is affixed to support 10 as shown in FIG. 4 to form a decorative laminate 5. A barrier layer 25 may be included between ink layer 30 and resinous coating 20 to form a transfer substrate 7 as illustrated in FIG. 5 which does not have a protective coating layer. The barrier layer 25 prevents absorbtion of the ink into the resinous coating 20.

The laminate of the invention is particularly suitable for use in automated processes. In the process of the invention a support 10 typically in the form of a web carrying a plurality of transfer substrates 7 aligned in single rows are passed under a flexible transfer pad 50. The transfer pad 50, preferably composed of silicon rubber and support substrate 10 are each first heated. Transfer pad 50 is then pressed onto substrate 7 as it is passed under the pad 50 so that the pad comes into contact with the protective coating layer 40 or ink layer 30 if the substrate 7 does not include a protective layer 40. As the transfer pad 50 is withdrawn, substrate 7 adheres to the pad and the support 10 separates from substrate 7. Substrate 7 is then pressed onto an article so that the resinous coating layer 20 contacts the article. As the transfer pad 50 is withdrawn it separates from substrate 7 and substrate 7 adheres to the article. A permanent bond between resinous coating layer 20 and the article then forms. If substrate 7 includes a protective coating 40, the ink design in ink layer 30 is distinctly visible through protective coating 40 after substrate 7 has been transferred to the article. Protective coating 40 dries to a smooth glossy finish which protects ink layer 30 from the environment.

In the first step of the process sufficient heat is applied to the exposed surface of support 10, to heat the substrate to a temperature which is above the melting point of the resinous coating 20. Support 10 is heated to a temperature typically between about 50° F. to 150° F. above the melting point of the resinous coating 20. Typically support 10 is heated to between about 390° F. to 420° F. so that the protective coating 40 (or ink layer 30, if protective coating is not included in substrate 7) becomes tacky, and resinous coating 20 softens and begins to melt enough to permit the support to be removed from transfer substrate 7. The rubber transfer pad 50, preferably composed of silicon rubber, having a smooth contact surface is heated to a temperature which is lower than the temperature to which support 10 is heated, preferably 40° to 120° F. lower than the temperature of support 10. Typically the transfer pad 50 is heated to between about 300° F. to 350° F.

In a second step of the process, as shown in FIG. 1, the hot transfer pad 50 is pressed against laminate 10 so as to make pressure contact with the protective coating 40 or ink layer 30 in the event protective coating 40 is omitted. The transfer pad is then withdrawn as shown in FIG. 2, at which time coating 20 splits to separate from support 10 thus releasing support 10. The coating 40 or ink layer 30 is sufficiently adhesive that the substrate 7 adheres to the transfer pad. Thus the substrate 7 is left in adhesive contact with the transfer pad 50 and resinous coating 20 is exposed to the environment.

In a fourth step of the process the hot transfer pad 50 and adhering substrate 7 is then pressed onto a surface of either a flat or three dimensional object including articles having compound curves, irregular surfaces or recessed panels so that the exposed coating layer 20 comes into pressure contact with the article. The article may consist of any of a wide range of materials including ceramic, plastic or glass.

The time interval between steps three and four is preferably less than about 5 seconds, more preferably between about 0.2 to 5 seconds. With the preferred composition for coating 20 disclosed in Table I, coating 20 will be sufficiently tacky up to temperatures from about 300° to 390° F.

As coating 20 comes into contact with article 60, it exhibits a tacky adhesive quality which is greater than the adhesive force between substrate 7 and transfer pad 50. Pad 50 is withdrawn from article 60 in a fifth step of the process. The time interval between the moment of contact of substrate 7 with the article and the moment of withdrawal of pad 50 away from the article is preferably less than about 1 second and as low as about 0.2 seconds, preferably between 0.2 and 0.5 seconds. Thus as transfer pad 50 is withdrawn from article 60 substrate 7 remains in adhesive contact with the article.

Coating 20 also functions to permanently bond substrate 7 to the article as the substrate is left to dry under ambient conditions. Thus, the resinous coating layer 20 has the unique property that it functions as a release layer to permit separation of substrate 10 in one step of the process and ultimately as a permanent adhesive to bond the ink layer 30 to an article.

As the substrate 7 cools, protective coating 40 when included in the substrate forms a hard protective lacquer coating over ink layer 30 forming a chemical and abrasion resistant protective layer, thus sealing the ink layer from exposure to moisture vapor, oxygen, grease and other corrosive elements in the environment. The resulting laminate has the property that the design, which may be either a singly or multiply colored design, shows distinctly therethrough regardless of the type of curvature of the surface to which it has been applied and regardless of whether the article is composed of ceramic, glass or plastic. Furthermore the outline of the protective coating layer 40 or the resinous coating 20 on the article is essentially invisible to normal inspection.

The coating layer 20 and protective coating 40 remain permanently affixed to article 60 as an integral part of the transfer substrate. When coating 40 is not included in substrate 1, ink layer 30 is exposed directly to the environment. The affixed substrate in not subjected to firing, but it should be appreciated that if article 60 is composed of glass, an inorganic flux material may be added to form ink layer 30. In this case if substrate 7 is exposed to high temperature firing, the organic layers 20 and 40 are volatilized leaving ink layer 30 fused to the article.

The preferred compositions of the respective layers comprising the decorative laminate 7 are set forth as follows with reference made to the accompanying tables.

Support (10):

The support 10 may be any support member or web to hold imprint substrate 7 securely attached thereto. However, it is preferable to have support 10 composed of a paper sheet more preferably a paper sheet that is clay coated to improve its smoothness quality and to retard penetration of the resinous coating 20 into the paper sheet as heat is applied to the back of the paper. The paper sheet may be any type of paper preferably Kraft type paper having a thickness of between about 2 to 2.5 mils and a basis weight of between about 26 to 40 lbs./ream (3000 sq. ft. per ream).

Resinous Coating Layer (20):

Coating layer 20 is preferably composed of a polyamide resin having a softening point advantageously between about 96° C.–105° C. The polyamide resin is preferably composed of the polymerization product of a linear methylene diamine and dimerized fatty acid. A polyamide resin which has been determined to be particularly advantageous is the polymerization products of hexamethylene diamine and dimerized linoleic acid, and tetramethylene diamine and dimerized oleic acid. The formulation shown in Table I is particularly suitable for resinous coating layer 20, since it has been discovered to have the required release properties permitting the easy removal of substrate 10 in one step of the process and ultimately as a permanent adhesive to bond ink layer 30 to article 60 in another step as discussed in the foregoing.

The resinous coating layer may alternatively be composed of other materials such as polyterpenes, vinyl toluene/alpha methyl styrene copolymers and ethylene vinyl acetate copolymers.

The coating layer 20 is made preferably by admixing the components shown in Table I in the weight proportions by weight indicated in Table I to form a polyamide resinous solution. The mixture is prepared at ambient temperature and utilizing conventional mixing equipment.

The preferred polyamide resin shown in Table I is sold under the trade name EMEREZ 1537 by Emery Industries of Cincinnati, Ohio. The polyamide resin EMEREZ 1537 is the polymerization product of the type above-mentioned, namely, the product of a methylene diamine such as hexamethylenediamine and a dimerized fatty acid such as dimerized linoleic acid. It has a softening point between 110° to 120° C., a viscosity at 160° C. of 3.5 to 5.0 poise, a Gardner color index (max.) of 4.0, an acid value of 4.0 max. and density at 25° C. of 8.1 lbs/gal.

The resinous solution is typically prepared by dissolving the polyamid resin EMEREZ 1537 in isopropyl alcohol and toluene in the proportions indicated in Table I and then modifying the resulting solution with about 4 to 16% by weight castor oil plasticizer and further by the addition of 2 to 8% by weight of erucamide (e.g. Kenamide E). The resulting polyamide resinous dispersion has a typical preferred composition as set forth in Table I.

Erucamide is a fatty amide of cis-13-docosenoic acid sold under the trade name KENAMIDE E by Humko Sheffield Chemical Div. of Kraftco Corp., Memphis, Tenn.

The erucamide additive permits the use of an increased amount of castor oil plasticizer which enhances the fluidity of the resinous coating layer. The fatty amide KENAMIDE-E has an average molecular weight of 335, an iodine value between about 70 to 80, a capillary melting point of about 76° to 86° C. and a Gardner color maximum of 5.

The polyamide resinous solution having a typical composition illustrated in Table I may be applied to the support 10 by any conventional printing methods, for example, by gravure, silk screen, offset, or flexographic printing methods. However, the gravure method is preferred because better process print can be realized by this method as well as better economy and color consistency with long runs. After the coating is applied to substrate 10 and dried, the solvents are evaporated and the resulting dried resinous coating (20) has a typical preferred composition as shown in Table I.

The dried resinous coating (20) covering support 10 has a basis weight preferably of between about 1.5 to 15 lbs./ream, more preferably between about 3 to 5 lbs./ream (3,000 sq. ft. per ream) and has a melt viscosity in the range of 3.5 to 8.5 poise at 160° C.

Ink Layer 30

Ink layer 30 may be composed of any conventional type of ink of any color including halftone colors. The inks which are preferable have the property that they do not soak into the resinous coating when applied without a barrier layer. The present invention has the advantage that multicolored inks can be used to produce a multicolored design image, that is, multicolored design images transferable in one pass.

A preferred ink is a polyamide-nitrocellulose ink. In this type ink the polyamide is a dimerized fatty acid copolymerized with a linear diamine which constitutes about 80 weight percent of the ink and the remainder is essentially nitrocellulose. Alternative inks having an acrylic, polyester, or vinyl base may also be employed.

If a protective coating 40 is not included in transfer substrate 7 as illustrated in FIGS. 4 and 5, ink layer 30 is preferably composed of an isobutyl methacrylate type ink which exhibits suitable adhesive and release characteristics to allow substrate 7 to be transferred to pad 50 and thence released therefrom as substrate 7 is pressed onto an article. A preferred ink of this type has been determined to be an ink having isobutyl methacrylate binder modified with maleic rosin and polyisoprene.

Protective Coating Layer (40)

The protective coating layer 40 has a preferred formulation shown in Table II. It is composed essentially of a film forming, multiaromatic, acid-based polyester designated polymer (i) and a second reinforcing polymer (ii) which contains bulky ring structure such as a polymerized rosin ester. The reinforcing polymer (ii) desirably may constitute between about 20 to 50 weight percent and preferably about 20 weight percent of the dried protective layer (40). The polymers (i) and (ii) should be soluble in the same or miscible solvents, such as toluene and methylethyl ketone. Advantageously, the polymers (i) and (ii) may have a refractive index of about 1.5.

The multiaromatic acid based polyester (Polymer (i)) is preferably composed of the reaction products of the polymer condensation products of polyester forming reactants of one or more glycols reacted with naphthalic, or phthalic acids.

A preferred polyester polymer (i) is a linear multiaromatic acid-based polyester such as that available under the trademark VITEL PE200 or VITEL PE222 from Goodyear Company of Akron, Ohio. The polyesters sold under the above VITEL trademark are aromatic acid-based polyesters having yellow, amorphous granules of Acid Number from 1 to 10, preferably 1 to 4, a Shore Durometer hardness of about 75 to 80 D, a specific gravity of about 1.25 and a ring and ball softening point of about 150° to 170° C.

A preferred reinforcing polyester polymer (ii) is a rosin ester formed typically by reaction of polyhydric alcohols, maleic anhydride or phenol aldehyde and rosin acids such as abietic and pimaric acids. The rosin ester, (polymer ii) is preferably composed of methyl abietate, methyl hydroabietate, glyceryl hydroabietate or ester gum.

A preferred reinforcing polymer (ii) of this type is sold under the trademark NEOLYN 23-75T from Hercules Chemical Company of Wilmington, Del.

A preferred protective coating layer 40 is formed of a polyester solution having the typical preferred composition set forth in Table II. The polyester resinous solution is prepared by admixing the constituents in the proportions set forth in Table II utilizing conventional mixing techniques. The polyester resinous solution is coated onto ink layer 30 by conventional printing methods such as by gravure, silk screen offset or flexographic methods. However, the gravure method is preferred because better process print and sharper coloring can be realized by this printing method as well as better economy and color consistency with long runs.

After the coating is applied to ink layer 30 and dried, the solvents are evaporated and the resulting dried protective coating has a typical preferred composition as shown in Table II. The dried protective coating layer 40 has a basis weight preferably between about 0.5 to 3 lbs./ream (3000 sq. ft. per ream).

Additionally the same preferred formulation above described and as shown in Table II for the dried protective coating layer 40 may be used as an optional barrier layer 25 between ink layer 30 and the resinous coating layer 20. The method of preparing the barrier layer may also be the same as above described for preparing the protective coating 40 by utilizing the same preferred polyester resinous solution formulation illustrated in Table II. If a barrier coating is used, the dried barrier layer between ink layer 30 and resinous coating 20 typically has a basis weight of between about 0.5 to 3 lbs./ream. Inclusion of a barrier coating is optional, but its use further protects ink layer 30 from having moisture vapor, oxygen and grease absorbed to it through resinous coating 20.

Transfer Pad 50

The transfer pad is preferably composed of silicone rubber. It has been found to be advantageous to provide the silicone rubber pad with a smooth surface and a convex curvature facing transfer substrate 7 so that the transfer substrate 7 has a smooth glossy surface after it has been transferred to the article. Any commercially available room temperature or heat curable silicone rubber may be suitable to make the pad. For example, the pad may be formed by casting room temperature vulcanizable silicone rubber with a suitable curing agent in proportion typically of 10 parts by weight silicone rubber to 1 part by weight curing agent. A suitable room temperature vulcanizable silicone rubber can be purchased under the trade name RTV 700, and the curing agent under the trade name BETA 5, both available from General Electric Company of Pittsfield, Mass. The cast silicone rubber pad product preferably has a Shore A hardness of about 4 to 35.

TABLE I

| | Percent by Weight |
|---|---|
| Polyamide Resinous Solution: | |
| Polyamide Resin (e.g. EMEREZ 1537) | 25.5 |
| Solvent 1 Isopropyl Alcohol | 49.0 |
| Solvent 2 Toluene | 21.0 |
| Plasticizer: Castor Oil | 3.0 |
| Erucamide (e.g. KENAMIDE E) | 1.5 |
| | 100.0 |
| Dried Resinous Coating (20): | |
| Polyamide Resin (e.g. EMEREZ 1537) | 85.0 |
| Plasticizer Castor Oil | 10.0 |
| Erucamide (e.g. KENAMIDE E) | 5.0 |
| | 100.0 |

TABLE II

| | Percent by Weight |
|---|---|
| Polyester Resinous Solution: | |
| Polyester Polymer (i) (e.g. VITEL PE-200 or VITEL PE-222) | 20.0 |
| Reinforcing Polyester Polymer (ii) (e.g. NEOLYN 23-75 T) | 5.0 |
| Solvent 1 Toluene | 5.0 |
| Solvent 2 Methylethyl ketone | 7.0 |
| | 100.0 |
| Dried Protective Layer (40): | |
| Polyester Polymer (i) (e.g. VITEL PE-200 or VITEL PE-222) | 80.0 |
| Polyester Polymer (ii) (E.G. NEOLYN 23-75 T) | 20.0 |
| | 100.0 |

Examples of the process of the invention and preferred method of making the product are given as follows.

EXAMPLE I

A support 10 in the form of a paper web carrying a multiplicity of transfer substrates 7 aligned in single rows were passed under a silicone rubber transfer pad 50 having a smooth surface. An automatic converyer was used to pass the transfer substrates 7 to and under the transfer pad 50. The paper web was composed of Kraft type paper having a basis weight of between about 20 to 40 pounds per ream and the substrate 7 was made in accordance with the specification set forth in Example II. As the paper web (support 10) passed along the conveyor, the support 10 was heated to a temperature of about 390° to 420° F. At this temperature level the protective coating 40 became tacky and the resinous coating softened and began to melt.

The silicone transfer rubber pad 50 was then heated to between about 300° F. to 350° F. As each heated substrate 7 in turn passed under hot transfer pad 50, the smooth surface of the transfer pad pressure contact with protective coating 40 in an automatic operation. As transfer pad 50 was withdrawn, the resinous coating 20 partially separated from support 10, thus releasing substrate 7 from support 10 exposing coating 20 to the environment. The coating 40 was sufficiently adhesive that the substrate 7 adhered to the transfer pad.

The transfer pad 50 and adhering substrate 7 was then pressed onto the surface of an article 60 which was automatically conveyed to the transfer pad. Article 60 was a plastic material and had compound curves and irregular surfaces or recessed panels.

The time interval between the moment of release of substrate 7 from support 10 to the moment of contact of substrate 7 with the article was about one second.

As the transfer pad 50 was withdrawn from article 60 substrate 7 remained in adhesive contact with the article in a permanent bond between the resinous coating layer 20 and the article. The ink design in ink layer 30 was distinctly visible through protective coating 40 after substrate 7 had been transferred to the article. Upon cooling, protective coating 40 developed a smooth glossy finish protecting ink layer 30 from the environment. The time interval between the moment of contact of substrate 7 with article 60 and to the moment of withdrawal of pad 50 away from the article was about 0.5 seconds.

The paper web (support 10) which was affixed with the remaining substrates 7 was conveyed automatically under transfer pad 50. As each substrate 7 in turn passed under the transfer pad, the above described sequence was repeated to transpose a substrate 7 from the web to another article. The process was repeated automatically until all the articles on the assembly line were imprinted with a substrate 7.

EXAMPLE II

A web of support 10 composed of Kraft type paper sheet having a basis weight of about 26 to 40 lbs./ream was fed through a gravure printer. The resinous coating (20) is formed over predesignated portions on the paper sheet by utilizing conventional gravure printing to apply the polyamide resinous solution to the paper sheet.

The polyamide resinous solution may be prepared in accordance with the formulation set forth in Table I as described in the foregoing. To facilitate the application of the resinous solution, it may be diluted further with solvent as desired, preferably so that its viscosity is about 25 sec. as measured with a #4 Ford cup. As the paper web was passed through the gravure printer, a coating of the polyamide resinous solution was uniformly applied to cover predesignated portions on a side of the paper sheet.

The coated paper was then passed through a conventional convective coater dryer wherein the coating is dried at about 200° F. to 250° F. evaporating the solvents and producing a dried resinous coating layer (20) having a composition typically as shown in Table I and a basis weight of between about 1.5 to 15 lbs./ream (3,000 sq. ft./ream).

The dried web was then passed in sequence through a gravure printer wherein the next layer, e.g., ink layer 30 typically composed of conventional polyamide nitrocellulose base was applied over the dried resinous coating. A single ink color or multicolored inks including halftones may be applied to produce an imprint design of any number of colors. The substrate overcoated with ink layer 30 was further passed sequentially to conventional convective drying carried out at about 200° to 250° F. to dry the ink.

The dried substrate was then again passed through a gravure printer wherein the polyester resinous solution was applied over ink layer 30. The polyester resinous solution may be applied in accordance with the formulation set forth in Table II as described in the foregoing. However, to facilitate application of this solution when employing a gravure printer, the solution may first be diluted further with solvent to yield a viscosity of about 20 seconds as measured with a #4 Ford cup.

The substrate overcoated with the polyester resinous solution is again subjected to drying in conventional convective coater dryers operating at about 200° F. to 250° F. until the polyester resinous solution dries to form a dried protective layer 40 having the typical preferred composition shown in Table II and basis weight of between about 0.5 to 3 lbs./ream.

Optionally, prior to applying ink layer 30, the substrate overcoated with dried resinous coating 20 can be passed through a gravure printer in order to apply a barrier coating 25 over ink layer 30. The barrier coating 25 may be composed of the same polyester resinous solution shown in Table II. The barrier coating, when used, was then dried in conventional convective coater driers at about 200° F. to 250° F., forming an optional barrier having typically the same composition as that of the dried protective layer 40 set forth in Table II and a basis weight between about 0.5 to 3 lbs./ream. Thus the substrate 7 is formed of a coating layer 20, optional barrier layer 25, ink layer 30 and dried protective coating 40.

In practice, rows of individual substrates 7 may be printed onto support substrate 10 in mass production automated fashion.

EXAMPLE III

The process of the invention was carried out in accordance with Example II and the laminate 5 and substrate 7 were manufactured as set forth in Example II except that ink layer 30 was not overcoated with protective coating 40. Instead substrate 7 was formed as illustrated in FIGS. 4 or 5 with the free surface of ink layer 30 exposed. Thus, in the process of the invention as transfer pad 50 was pressed onto substrate 7 the pad made direct contact with the exposed surface of ink layer 30 and after substrate 7 was transferred to article 60 the free surface of ink layer 30 was left exposed to the environment. In accomplishing this embodiment of the invention ink layer 30 was formed by employing an ink formed of conventional pigment, a binder solvent and a binder composed of a film forming isobutyl methacrylate ink modified with maleic rosin and polyisoprene. The isobutyl methacrylate is present in the binder in an amount preferably beteen about 60 to 80 percent by weight of the binder, the maleic rosin between about 15 to 25 percent by weight and the polyisoprene between about 5 to 15 percent by weight of the binder. A typical preferred binder used in forming ink layer 30 was composed of 70 parts by weight isobutyl methacrylate modified with 20 parts by weight maleic rosin and 10 parts by weight polyisoprene. The ink layer 30 was coated onto resinous coating 20 or alternatively onto barrier layer 25 and dried in the manner set forth in Example II to form the substrate 7 illustrated in FIGS. 4 and 5 respectively. The dried ink layer 30 had a basis weight of between about 0.5 to 2 lbs./ream.

It was found that the ink layer 30 in this embodiment exhibited the required adhesive characteristics to permit transfer of substrate 7 to transfer pad 50 and thence to article 60 when the process of the invention was carried out as set forth in Example I. Upon transfer of substrate 8 onto article 60, the ink design in ink layer 30 was left indelibly imprinted on article 60. Ink layer 30 exhibited abrasion and corrosion resisting properties sufficient to permit a variety of applications, particularly where article 60 contains chemically inactive and non-toxic components and where article 60 is not intended to come into contact frequently with highly abrasive materials.

Although the transfer substrate 7 is removed from substrate 10, transferred to pad 50 and then to the desired article all preferably within the context of an automated process in accordance with the foregoing description it should be appreciated that other variations including manual transfer of substrate 7 are also within the scope of the present invention. The invention, therefore, is not intended to be limited to the description in the specification but only by the claims and equivalents thereof.

We claim:

1. A process for transferring a film laminate to an article from a support member, wherein the film laminate comprises a resinous coating layer in contact with said support member, an ink layer, and a protective coating layer, said resinous coating layer comprised of a film forming component which is the polymerization product of a diamine with a dimerized fatty acid, said process comprising the steps of:

(a) heating the support member to a first temperature above the melting point of the resinous coating layer, (b) heating the surface of a resilient transfer pad to a second temperature lower than said first temperature, (c) pressing the heated transfer pad against the film laminate to transfer the laminate thereto, (d) pressing the film laminate against the article so that the resinous coating layer contacts the article, and (e) withdrawing the transfer pad from the article so that the pad separates from the film laminate, which remains in adhesive contact with the article.

2. A process as in claim 1 wherein step (c) of transferring the film laminate from said support member to a transfer pad comprises the steps of:

($c_1$) pressing the transfer pad onto the film laminate so that the pad contacts the protective coating layer, and ($c_2$) withdrawing the pad to separate the film laminate from the support member, the film laminate attaching to the pad.

3. A process as in claim 1 wherein the support member is heated to a temperature in a range between about 50° F. to 150° F. above the melting point of the resinous coating layer.

4. A process as in claim 1 wherein the transfer pad is heated to a temperature in a range between about 40° F. to 120° F. lower than the temperature to which the support member is heated in step (a).

5. A process as in claim 1 wherein the transfer pad is heated to a temperature between about 300° F. to 350° F. and the support member is heated to a temperature between about 390° F. to 420° F.

6. A process as in claim 2 wherein the time interval between steps ($C_2$) and (d) is less than about 5 seconds.

7. A process as in claim 2 wherein the time interval between steps ($C_2$) and (d) is between about 0.2 to 5 seconds.

8. A process as in claim 1 wherein the transfer pad is comprised of rubber.

9. A process as in claim 1 wherein the transfer pad is comprised of silicone rubber.

10. A process as in claim 1 wherein the transfer pad is comprised of a silicone rubber having a convex smooth surface.

11. A process as in claim 1 wherein the support member is a paper sheet.

12. A process as in claim 1 wherein the support member is a paper sheet having a basis weight of between about 26 to 40 lbs. per ream.

13. A process as in claim 1 wherein the resinous coating layer has a basis weight between about 1.5 to 15 lbs. per ream and the protective coating layer has a basis weight of between about 0.5 to 3 lbs. per ream.

14. A process as in claim 1 wherein the resinous coating further comprises a plasticizer and the film forming component comprises at least about 80 percent by weight of the resinous coating.

15. A process as in claim 1, wherein the resinous coating further comprises a plasticizer and erucamide, the weight ratio of plasticizer to erucamide being in a range between about 5/1 to 15/1 and the film forming component comprises between about 70 to 90 percent by weight of the resinous coating.

16. A process as in claim 14 wherein the plasticizer is castor oil.

17. A process as in claim 1 wherein the protective coating layer is comprised of a film forming, multiaromatic acid based polyester and a polymerized rosin ester.

18. A process as in claim 1 wherein the film forming component is selected from the polyamide group consisting of the polymerization product of hexamethylene diamine and dimerized linoleic acid, and tetramethylene diamine and dimerized oleic acid.

19. A process as in claim 17 wherein the polymerized rosin ester comprises between about 20 to 50 percent by weight of the protective coating.

20. A process as in claim 17 wherein the film forming, multiaromatic acid based polyester is the reaction product of a glycol and at least one other reactant selected from the acid group consisting of naphthalic and phthalic acids.

21. A process as in claim 17 wherein the polymerized rosin ester is selected from the group consisting of methyl abietate, methyl hydroabietate, glyceryl hydroabietate, and ester gum.

22. A process as in claim 17 wherein the rosin ester is the reaction product formed of one reactant selected from the group consisting of a polyhydric alcohol, maleic anhydride and phenol aldehyde and a second reactant selected from the rosin acid group consisting of abietic and pimaric acids.

23. A process as in claim 1 wherein the film forming component is comprised of the polymerization product of hexamethylene diamine and dimerized linoleic acid.

24. A process as in claim 1 wherein the film laminate includes a barrier layer between the resinous coating layer and the ink layer, said barrier layer consists essentially of the same composition as the protective coating layer.

25. A process for transferring a film laminate from a support member affixed thereto, the film laminate comprising a resinous coating layer and an ink layer, the resinous coating layer in contact with said support member, said resinous coating layer comprised of a film forming component which is the polymerization product of a diamine with a dimerized fatty acid, said process comprising the steps of:

(a) heating the support member to a temperature above the melting point of the resinous coating layer, (b) heating the surface of a resilient transfer pad to a temperature lower than said temperature to which the support member is heated in step (a), (c) pressing the heated transfer pad against the film laminate to transfer the laminate thereto, (d) pressing the film laminate against the article so that the resinous coating layer contacts the article, and (e) withdrawing the pad from the article so that the pad separates from the film laminate and the film laminate remains in adhesive contact with the article.

26. A process as in claim 25 wherein step (c) of transferring the film laminate from said support member to a transfer pad comprises the steps of:

($c_1$) pressing the transfer pad onto the film laminate so that the pad contacts the ink layer, and ($c_2$) withdrawing the pad to separate the film laminate from the support member, the transfer substrate attaching to the pad.

27. A process as in claim 26 wherein the support member is heated to a temperature in a range between about 50° F. to 150° F. above the melting point of the resinous coating layer.

28. A process as in claim 26 wherein the transfer pad is heated to a temperature in a range between about 40° F. to 120° F. lower than the temperature to which the support member is heated in step (a).

29. A process as in claim 26 wherein the transfer pad is heated to a temperature between about 300° F. to 350° F. and the support member is heated to a temperature between about 390° F. to 420° F.

30. A process as in claim 26 wherein the time interval between steps ($C_2$) and (d) is less than about 5 seconds.

31. A process as in claim 26 wherein the time interval between steps ($C_2$) and (d) is between about 0.2 to 5 seconds.

32. A process as in claim 26 wherein the transfer pad is comprised of silicone rubber.

33. A process as in claim 25 wherein the film forming component is selected from the polyamide group consisting of the polymerization product of hexamethylene diamine and dimerized linoleic acid, and tetramethylene diamine and dimerized oleic acid.

34. A process as in claim 25 wherein the film forming component comprises at least about 80 percent by weight of the resinous coating.

35. A process as in claim 25 wherein the ink layer is comprised of a binder comprising isobutyl methacrylate.

36. A process as in claim 35 wherein the binder in said ink layer is further comprised of maleic rosin and polyisoprene.

37. A process as in claim 35 wherein the isobutyl methacrylate comprises between about 60 to 80 percent by weight of the binder.

38. A process as in claim 37 wherein the maleic rosin comprises between about 15 to 25 percent by weight of the binder and the polyisoprene comprises between about 5 to 15 percent by weight of the binder.

* * * * *